United States Patent [19]
Tzannes et al.

[11] Patent Number: 5,832,030
[45] Date of Patent: Nov. 3, 1998

[54] MULTI-CARRIER TRANSMISSION SYSTEM UTILIZING CHANNELS WITH DIFFERENT ERROR RATES

[75] Inventors: Michael A. Tzannes, Newton; Richard W. Gross, Arlington, both of Mass.

[73] Assignee: Aware, Inc., Bedford, Mass.

[21] Appl. No.: 661,974

[22] Filed: Jun. 12, 1996

[51] Int. Cl.$^6$ ...................................................... H04K 1/10
[52] U.S. Cl. ........................ 375/260; 375/285; 370/480; 704/201
[58] Field of Search ..................................... 375/260, 285, 375/296; 370/480, 484; 348/397, 398; 395/2.29, 2.67; 704/201, 220, 500, 503

[56] References Cited

U.S. PATENT DOCUMENTS

| | | | |
|---|---|---|---|
| 4,679,227 | 7/1987 | Hughes-hartogs | 379/98 |
| 4,731,816 | 3/1988 | Hughes-hartogs | 379/98 |
| 5,206,886 | 4/1993 | Bingham | 375/344 |
| 5,285,474 | 2/1994 | Chow et al. | 375/231 |
| 5,497,398 | 3/1996 | Tzannes et al. | 395/260 |
| 5,636,246 | 6/1997 | Tzannes et al. | 375/221 |

*Primary Examiner*—Don N. Vo
*Attorney, Agent, or Firm*—Calvin B. Ward

[57] ABSTRACT

A communication system for transmitting data comprising first and second data streams on a communication link having a communication channel of fixed bandwidth. The first and second data streams have first and second error tolerances, respectively, the first error tolerance being greater than the second error tolerance. The communication system includes a transmitter and a receiver, the transmitter transmitting data on the communication link for receipt by the receiver. The transmitter includes circuitry for dividing the communication channel into a plurality of sub-bands. In the preferred embodiment of the present invention, each sub-band has a bandwidth chosen such that distortions introduced by the communication link in the sub-band may be represented by an attenuation coefficient and phase shift. The present invention generates a signal which is the sum of a plurality of carriers, one per sub-band, in which the amplitude of carrier in the sum signal is determined by a symbol set having a plurality of symbols. A portion of the data is transmitted in each of the sub-bands by selecting symbols from the symbol set associated with that sub-band. The number of symbols in the symbol set is chosen to provide an error rate for data transmitted in the sub-band, the error rate for a first one of the sub-bands being greater than the error rate for a second one of the sub-bands.

3 Claims, 1 Drawing Sheet

MULTI-CARRIER TRANSMISSION SYSTEM UTILIZING CHANNELS WITH DIFFERENT ERROR RATES

FIELD OF THE INVENTION

The present invention relates to data transmission systems, and more particularly, to a method for providing data channels of varying accuracy.

BACKGROUND OF THE INVENTION

In a multicarrier system, a communication path having a fixed bandwidth is divided into a number of sub-bands having different frequencies. The width of the sub-bands is chosen to be small enough to allow the distortion in each sub-band to be modeled by a single attenuation and phase shift for the band. If the noise level in each band is known, the volume of data sent in each band may be maximized for any given bit error rate by choosing a symbol set for each channel having the maximum number of symbols consistent with the available signal to noise ratio of the channel. By using each sub-band at its maximum capacity, the amount of data that can be transmitted in the communication path for a given error rate is maximized.

For example, consider a system in which one of the sub-channels has a signal to noise ratio which allows at least 16 digital levels to be distinguished from one another with an acceptable error rate. In this case, a symbol set having 16 possible signal values is chosen. If the incoming data stream is binary, each consecutive group of 4 bits is used to compute the corresponding symbol value which is then sent on the communication channel in the sub-band in question. This value is sent by modulating a corresponding carrier by the symbol value.

It is generally assumed in such transmission systems that all data is of equal value and is to be sent with the same bit error rate. This bit error rate determines the maximum data rate on the channel for any given noise environment. If the allowable bit error rate is increased, the channel throughput can be significantly increased. Similarly, if more stringent bit error rates are required, the channel throughput is markedly reduced.

There are many applications in which the data stream can be divided into a plurality of data streams having different accuracy requirements. For example, different sub-bands may be assigned to different users whose accuracy requirements differ. A user sending image data in a video conferencing application can tolerate a much higher error rate than a user transferring a data file in which any error would be considered unacceptable. The consequence of an error in the video channel is a small transient distortion in one frame of the video sequence. If the number of such distortions is small, the distortions will have little effect on the overall quality of the video conferencing system.

Broadly, it is the object of the present invention to provide an improved multi-carrier transmission system.

It is a further object of the present invention to provide a multi-carrier transmission system in which the error rates in the various channels are set to match the accuracy requirements of the data being transmitted.

These and other objects of the present invention will become apparent to those skilled in the art from the following detailed description of the invention and the accompanying drawings.

SUMMARY OF THE INVENTION

The present invention is a communication system for transmitting data comprising first and second data streams on a communication link having a communication channel of fixed bandwidth. The first and second data streams have first and second error tolerances, respectively, the first error tolerance being greater than the second error tolerance. The communication system includes a transmitter and a receiver, the transmitter transmits data on the communication link for receipt by the receiver. The transmitter includes circuitry for dividing the communication channel into a plurality of sub-bands. In the preferred embodiment of the present invention, each the sub-band has a bandwidth chosen such that distortions introduced by the communication link in the sub-band may be represented by an attenuation coefficient and phase shift. The present invention generates a signal which is the sum of plurality of carriers, one per sub-band. The amplitude of carrier in the sum signal is determined by a symbol set having a plurality of symbols. A portion of the data is transmitted in each of the sub-bands by selecting symbols from the symbol set associated with that sub-band. The number of symbols in the symbol set is chosen to provide a predetermined error rate for data transmitted in the sub-band, the error rate for a first one of the sub-bands being greater than the error rate for a second one of the sub-bands. In the preferred embodiment of the present invention, the first data stream is transmitted in the first one of the sub-bands and the second data stream is transmitted in the second one of the sub-bands. In one embodiment of the present invention, the number of symbols in one of the symbol sets is varied in response to the error tolerance of the data transmitted in the sub-band associated with that symbol set. In this embodiment, a third one of the channels is used to communicate the identity the symbol set used in the sub-band having the variable symbol set. This signaling sub-band has a symbol set that is not varied over the time in which the first and second data streams are transmitted.

DETAILED DESCRIPTION OF THE INVENTION

Figure 1:
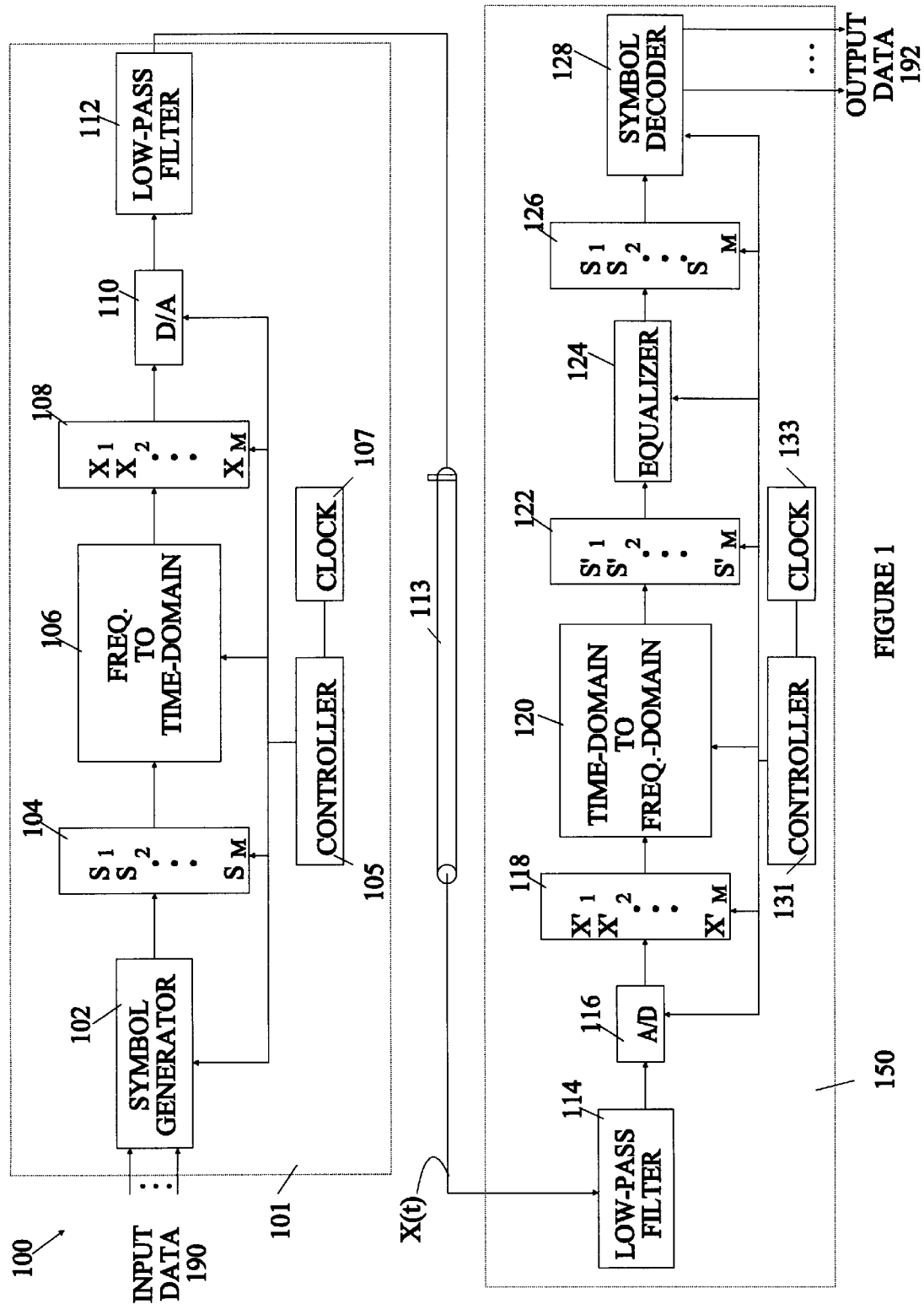
FIG. 1 is a block diagram of a multicarrier transceiver 100 which may be used to practice the present invention.

The manner in which the present invention operates can be more easily understood with reference to FIG. 1 which is a block diagram of a multicarrier transceiver 100 which may be used to practice the present invention. Transceiver 100 transmits data on a communication link 113. The data transmitted on communication link 113 includes at least two data streams having different error tolerances. The input data streams are received by a symbol generator 102 which converts a run of data bits from each input stream into a symbol. A total of M symbols $S_1, S_2, \ldots S_M$ are stored in a register 104. The number of symbols generated from any particular data stream will, in general, depend on the desired relative throughput that is to be provided to the different data streams.

The number of possible states for each symbol will depend on the noise levels in the corresponding frequency band on the transmission channel 113 and on the error rate that can be tolerated by the data. For the purposes of the present discussion, it is sufficient to note that each symbol is a number whose absolute value may vary from 0 to some predetermined upper bound. For example, if a symbol has 16 possible values, this symbol can be used to represent 4 bits in the corresponding input data stream.

Transceiver 100 treats the symbols $S_i$ as if they were the amplitude of a signal in a narrow frequency band. The bandwidth of each sub-band is preferably chosen such that the distortions introduced by the communication link can be modeled by an attenuation and phase shift that do not vary significantly over the transmission time of the data stream. These variables are measured periodically by sending known signals over the communication link.

Frequency to time-domain transform circuit 106 generates a time domain signal $X_i$, for i from 0 to M-1, that has the frequency components with amplidutes $S_i$. This signal is equivalent to the sum of M sinusoidally varying oscillators in which the $i^{th}$ oscillator has an amplitude of $S_i$. The time domain signals are stored in a shift register 108. The contents of shift register 108 represent, in digital form, the next segment of the time domain signal that is to be actually transmitted over communication link 113. The actual transmission is accomplished by clocking the digital values onto communication link 113 (possibly after upconversion to radio frequencies) after converting the values to analog voltages using D/A converter 110. Clock 109 provides the timing pulses for the operation. The output of D/A converter 110 is low-pass filtered by filter 112 before being placed on communication link 113.

At the receiving end of transmission link 113, the transmitted segment of the time domain signal is recovered. The signals received on communication link 113 are low-pass filtered to reduce the effects of high-frequency noise transients. The signals are then digitized and shifted into a register 118. When M values have been shifted into register 118, the contents thereof are converted via a time-domain to frequency-domain transform circuit 120 to generate a set of frequency domain symbols $S'_i$. This transformation is the inverse of the transformation generated by frequency to time-domain transform 106. It should be noted that communication link 113 will, in general, both attenuate and phase shift the signal represented by the $X_i$. Hence, the signal values received at low-pass filter 114 and A/D converter 116 will differ from the original signal values. Thus, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for intersymbol interference arising from synchronization errors between the transmitter and receiver. Finally, the contents of buffer 126 are decoded to regenerate the original data streams shown at 192 by symbol decoder 128.

For the purposes of this discussion, the transformation used between the frequency and time domains will be assumed to be a Fourier-based transform such as a DCT. As noted with reference to FIG. 1, the data to be transmitted is grouped into blocks, each block containing M symbols. The number of possible states for each symbol depends on the signal-to-noise ratio in a corresponding frequency band on the communication link and the maximum allowable bit error rate. Time is divided into contiguous, non-overlapping equal length intervals, referred to as frames. Each frame is divided into M sub-intervals. In each time frame, one block of M symbols is transmitted. The transmission signal sent on communication link 113 shown in FIG. 1 may be viewed as consisting of the sum of M sub-carriers with each sub-carrier being amplitude modulated by a corresponding symbol over the time period of one frame. The amplitude of the modulation signal is constant over the frame. The segment of the transmission signal corresponding to one frame is a pulse having a length equal to one frame time. The pulse for frame k is completed before the pulse for frame k+1 is sent. The shape of the pulse is a sequence of M values, one per sub-interval, obtained by applying the inverse discrete Fourier transform to the vector of M symbol values to obtain the M time-domain values. At the receiver, the M time-domain samples are input to a discrete Fourier transform to recover the M symbol values.

A noise pulse having an amplitude of dV in a frequency channel will alter the corresponding symbol value by an amount proportional to dV. If the alteration is less than half of the difference between the carrier amplitude corresponding to the correct symbol value and the carrier amplitude corresponding to the next allowable symbol value, the noise will not change the symbol value. The distribution of dV values is determined by the noise distribution on the communication channel. The difference between successive allowed symbol values is determined by the number of states assigned to the symbols in the channel and the transmission power. Hence, the signal-to-noise ratio and the number of symbol states determines the bit error rate on the channel. If the number of allowed symbol states increases, the difference between successive symbol states will decrease unless the power is changed. Since the power is, in general, fixed. Varying the number of symbol states results in a tradeoff between bit error rate and channel throughput.

In prior art systems, the number of states for the symbols in the various channels are chosen so as to provide the same bit error rate in each of the channels. The incoming data stream is packaged into symbols consistent with this assignment and sent over a plurality of channels. If the communication channel is to be shared by a number of users, each user is given sub-set of the available channels. In this case, the incoming data stream is actually a plurality of individual data streams, one per user. The specific sub-bands to which the data was assigned in prior art systems was irrelevant, since all sub-bands had the same error rate.

In the present invention, the number of states for the symbols in the various sub-bands is chosen so as to provide sub-bands having differing bit error rates. The input data 190 consists of a plurality of data streams. For the purposes of this discussion, each data stream will be assumed to be from a different "user"; however, it will be apparent to those skilled in the art that the from data streams can represent data the same user. Each user provides data indicating the desired bit error rate for that user's data stream. This information may be provided by header information in the begining of the data stream or by the input of signal generator 102 on which the data is received. Data streams requiring less accuracy are then transmitted on the channels having the higher bit error rates. Since the symbol set may be changed at any time, the allocation of the communication link may be optimized on a more or less continuous basis, assuming that there are "clients" available for the various channels. However, in the preferred embodiment of the present invention, specific channels are assigned symbol sets more or less permanently. In this case, the transmission system routes data received to one or more channels having error rates consistent with the error rate requirements of the data.

As noted above, embodiments in which the system reconfigures the symbol sets in response to signals indicating the acceptable error rates may also be utilized. In such a reconfigurable embodiment, at least one channel must remain fixed in its symbol set to provide a means for signaling the interface at the receiving end of the communication link that the symbol set has been changed on one or more of the other channels.

While the above embodiments of the present invention have been described in terms of a particular multi-carrier implementation, it will be apparent to those skilled in the art that the teachings of the present invention can be applied to any multi-carrier system. Accordingly, the present invention is to be limited solely by the scope of the following claims.

What is claimed is:

1. A communication system for transmitting data comprising first and second data streams, on a communication link having a channel of fixed bandwidth, said first and second data streams having first and second error tolerances, respectively, said first error tolerance being greater than said second error tolerance, said communication system comprising a transmitter and a receiver, said transmitter transmitting data on said communication link for receipt by said receiver, said transmitter comprising:

means for dividing said channel into a plurality of sub-bands, each sub-band having a bandwidth chosen such that distortions introduced by said communication link in said sub-band may be represented by an attenuation coefficient and phase shift;

means for generating a sum signal comprising the sum of a plurality of carrier signals, each of said carrier signals corresponding to each of said sub-bands, said carrier having a frequency in said corresponding sub-band and an amplitude determined by a symbol set having a plurality of symbols, wherein a portion of said data is transmitted in each of said sub-bands, said portion being transmitted by selecting a symbol from the symbol set corresponding to that sub-band, and wherein the number of symbols in said symbol set is chosen to provide an error rate for data transmitted in said sub-band, said error rate for a first one of said sub-bands being greater than said error rate for a second one of said sub-bands; and means for transmitting said sum signal on said communication link.

2. The communication system of claim 1 wherein said first data stream is transmitted in said first one of said sub-bands and said second data stream is transmitted in said second one of said sub-bands.

3. A communication system for transmitting data comprising first and second data streams, on a communication link having a channel of fixed bandwidth, said first and second data streams having first and second error tolerances, respectively, said first error tolerance being greater than said second error tolerance, said communication system comprising a transmitter and a receiver, said transmitter transmitting data on said communication link for receipt by said receiver said transmitter comprising:

means for dividing said channel into a plurality of sub-bands, each said sub-band having bandwidth chosen such that distortions introduced by said communication link in said sub-band may be represented by an attenuation coefficient and phase shift, means for generating a sum signal comprising the sum of a plurality of carrier signals, each of said carrier signals corresponding to each of said sub-bands, said carrier having a frequency in said corresponding sub-band and an amplitude determined by a symbol set having a plurality of symbols, wherein a portion of said data is transmitted in each of said sub-bands, said portion being transmitted by selecting a symbol from the symbol set corresponding to that sub-band, and wherein the number of symbols in said symbol set is chosen to provide an error rate for data transmitted in said sub-band, said error rate for a first one of said sub-bands being greater than said error rate for a second one of said sub-bands; and means for transmitting said sum signal on said communication link, wherein one of said sub-bands has a symbol set that is varied in response to the error tolerance of the data transmitted in said sub-band and wherein a third one of said channels is used to communicate the identity of the symbol set used in said first one of said sub-bands to said receiver, said third one of said sub-bands having a symbol set that is not varied over the time in which said first and second data streams are transmitted.

* * * * *